US009495371B2

(12) United States Patent
Fortune et al.

(10) Patent No.: US 9,495,371 B2
(45) Date of Patent: Nov. 15, 2016

(54) UNIFIED ACCESS TO RESOURCES

(75) Inventors: Erik Fortune, Redmond, WA (US);
Rylan Hawkins, Seattle, WA (US);
Peter G. Constable, Redmond, WA (US); Ashish Gupta, Redmond, WA (US); Tim Wegner, Kenmore, WA (US); Alex Chapman, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 270 days.

(21) Appl. No.: 12/979,356

(22) Filed: Dec. 28, 2010

(65) Prior Publication Data
US 2012/0166513 A1 Jun. 28, 2012

(51) Int. Cl.
*G06F 15/16* (2006.01)
*G06F 17/30* (2006.01)

(52) U.S. Cl.
CPC .............. *G06F 17/30091* (2013.01)

(58) Field of Classification Search
CPC .................................. G06F 17/30091
USPC ........................................ 709/227
See application file for complete search history.

(56) References Cited

U.S. PATENT DOCUMENTS

| 6,704,776 | B1 | 3/2004 | Fortune |
| 7,146,353 | B2 | 12/2006 | Garg |
| 7,178,142 | B2 | 2/2007 | Bennett |
| 7,305,376 | B2 | 12/2007 | Wu |
| 7,356,615 | B2 * | 4/2008 | Cai et al. ............... 709/246 |
| 7,451,219 | B2 | 11/2008 | Brey |
| 7,454,516 | B1 | 11/2008 | Weinert |
| 7,584,262 | B1 | 9/2009 | Wang |

(Continued)

FOREIGN PATENT DOCUMENTS

| CN | 1235313 A | 11/1999 |
| CN | 1561043 A | 1/2005 |

(Continued)

OTHER PUBLICATIONS

Zhang, et al., "A Dynamically Load and Unload Enabled Aggregation Model Based on the WPS", Retrieved at <<http://www.isprs.org/proceedings/XXXVIII/part2/Papers/138_Paper.pdf>>, Joint International Conference on Theory, Data Handling and Modelling in GeoSpatial Information Science, May 26-28, 2010.

(Continued)

*Primary Examiner* — Douglas Blair
(74) *Attorney, Agent, or Firm* — Timothy Churna; Raghu Chinagudabha; Micky Minhas

(57) ABSTRACT

Architecture that provides a unified interface to access resources in different formats and in disparate resource locations for a process (e.g., consuming application). The unified interface is extensible such that users can add additional components to the unified interface to provide access to new resources and new resource references. The interface provides the capability to create a single comprehensive index of all available resources regardless of the resource format. Format-specific indexers are provided for the resources to find, enumerate, and process the resources into a structure suitable for processing by an indexing component into the index. A user can introduce new format-specific indexers for new resources and new resource references for processing by the indexing component into the index. The unified interface now provides access to the new resources and new resources references as well.

6 Claims, 8 Drawing Sheets

(56) References Cited

U.S. PATENT DOCUMENTS

| | | | |
|---|---|---|---|
| 7,644,061 B1 | 1/2010 | Fallis | |
| 7,673,299 B2 | 3/2010 | Bennett | |
| 7,685,331 B2 | 3/2010 | Wang | |
| 7,720,907 B2 | 5/2010 | Brey | |
| 7,757,227 B2 | 7/2010 | Duplessis | |
| 7,814,492 B1 | 10/2010 | Creemer | |
| 7,831,975 B2 | 11/2010 | Ode | |
| 7,962,470 B2* | 6/2011 | Degenkolb et al. | 707/709 |
| 7,971,198 B2 | 6/2011 | Almeida | |
| 8,015,301 B2* | 9/2011 | Carter et al. | 709/229 |
| 8,151,080 B2 | 4/2012 | Naganuma | |
| 8,191,060 B2 | 5/2012 | Malasky | |
| 8,224,804 B2 | 7/2012 | Unnikrishnan | |
| 8,271,761 B2 | 9/2012 | Naganuma | |
| 8,275,888 B2 | 9/2012 | Branigan | |
| 8,276,121 B2 | 9/2012 | Miller | |
| 8,302,100 B2 | 10/2012 | Deng | |
| 8,341,185 B2* | 12/2012 | Sathish | 707/791 |
| 8,341,595 B2 | 12/2012 | Arner | |
| 8,418,181 B1 | 4/2013 | Sirota | |
| 8,423,746 B2 | 4/2013 | Naganuma | |
| 8,495,570 B2* | 7/2013 | Fortune et al. | 717/121 |
| 9,021,434 B2 | 4/2015 | Fortune | |
| 9,047,103 B2 | 6/2015 | Fortune | |
| 2004/0158480 A1 | 8/2004 | Lubars | |
| 2005/0102253 A1 | 5/2005 | Wu | |
| 2005/0273507 A1 | 12/2005 | Yan et al. | |
| 2006/0053169 A1* | 3/2006 | Straub et al. | 707/200 |
| 2006/0085474 A1* | 4/2006 | Tsubono | 707/102 |
| 2006/0106927 A1 | 5/2006 | Brey | |
| 2006/0136401 A1 | 6/2006 | Normington | |
| 2006/0242288 A1 | 10/2006 | Masurkar | |
| 2006/0271341 A1 | 11/2006 | Brown | |
| 2006/0288044 A1* | 12/2006 | Kashiwagi et al. | 707/200 |
| 2007/0038992 A1 | 2/2007 | Mahasintunan | |
| 2007/0168264 A1 | 7/2007 | Slone | |
| 2007/0256048 A1 | 11/2007 | Relyea | |
| 2007/0294699 A1 | 12/2007 | Bahl | |
| 2008/0065664 A1 | 3/2008 | Kehn | |
| 2008/0082490 A1 | 4/2008 | MacLaurin | |
| 2008/0313331 A1 | 12/2008 | Boykin et al. | |
| 2009/0063396 A1 | 3/2009 | Gangarapu | |
| 2009/0070769 A1 | 3/2009 | Kisel | |
| 2009/0094609 A1 | 4/2009 | Burukhin | |
| 2009/0132232 A1 | 5/2009 | Trefler | |
| 2009/0187727 A1 | 7/2009 | Caprioli | |
| 2009/0216707 A1 | 8/2009 | Keohane | |
| 2009/0222787 A1 | 9/2009 | Aldahleh | |
| 2009/0228676 A1 | 9/2009 | Naganuma | |
| 2009/0228879 A1 | 9/2009 | Blohm | |
| 2009/0240811 A1 | 9/2009 | Wei et al. | |
| 2009/0271762 A1 | 10/2009 | Taylor | |
| 2009/0276783 A1 | 11/2009 | Johnson | |
| 2009/0292545 A1 | 11/2009 | Mohammed | |
| 2009/0328028 A1 | 12/2009 | O'Rourke et al. | |
| 2010/0011368 A1 | 1/2010 | Arakawa | |
| 2010/0083219 A1 | 4/2010 | Tavares | |
| 2010/0094900 A1 | 4/2010 | Hughes et al. | |
| 2010/0131922 A1 | 5/2010 | Shenfield | |
| 2010/0138818 A1 | 6/2010 | Harrop | |
| 2010/0138825 A1 | 6/2010 | Harrop | |
| 2010/0161778 A1 | 6/2010 | Guinard et al. | |
| 2010/0199261 A1 | 8/2010 | Shenfield | |
| 2010/0228861 A1 | 9/2010 | Arsovski et al. | |
| 2010/0235844 A1 | 9/2010 | Arwe | |
| 2011/0022582 A1 | 1/2011 | Unnikrishnan | |
| 2011/0113327 A1 | 5/2011 | Hagelund | |
| 2011/0125904 A1 | 5/2011 | Branigan | |
| 2011/0213884 A1 | 9/2011 | Ferris | |
| 2011/0246438 A1* | 10/2011 | Sathish | 707/706 |
| 2011/0258407 A1 | 10/2011 | Naganuma | |
| 2011/0276939 A1 | 11/2011 | Frankin et al. | |
| 2012/0081395 A1 | 4/2012 | Adi et al. | |
| 2012/0159260 A1 | 6/2012 | Fortune | |
| 2012/0159439 A1 | 6/2012 | Kaplinger | |
| 2012/0167046 A1 | 6/2012 | Jones | |
| 2012/0167111 A1* | 6/2012 | Fortune et al. | 718/104 |
| 2012/0191941 A1 | 7/2012 | Naganuma | |
| 2012/0272204 A1 | 10/2012 | Olewski | |
| 2013/0047150 A1 | 2/2013 | Malasky | |
| 2013/0290930 A1 | 10/2013 | Fortune | |
| 2014/0019953 A1 | 1/2014 | Kolesnikov et al. | |

FOREIGN PATENT DOCUMENTS

| | | |
|---|---|---|
| CN | 101313300 A | 11/2008 |
| CN | 101416188 A | 4/2009 |
| CN | 101526884 | 9/2009 |
| WO | 2006063617 | 6/2006 |

OTHER PUBLICATIONS

Liu, et al., "Adaptive Entitlement Control of Resource Containers on Shared Servers", Retrieved at <<http://www.cs.mcgill.ca/~xueliu/publications/IM2005_Entitlement.pdf >>, 9th IFIP/IEEE International Symposium on Integrated Network Management, May 15-19, 2005.

Banga, et al., "Resource Containers: A New Facility for Resource Management in Server Systems", Retrieved at <<http://www.usenix.org/events/osdi99/full_papers/banga/banga.pdf >>, Proceedings of the 3rd Symposium on Operating Systems Design and Implementation, Feb. 1999.

Lakshmanan, et al., "Distributed Resource Kernels: OS Support for End-To-End Resource Isolation", Retrieved at <<http://www.ece.cmu.edu/~klakshma/pubs/rtas_08.pdf>>, Proceedings of the IEEE Real-time and Embedded Technology and Applications Symposium (RTAS), Apr. 2008.

Aron, Mohit., "Resource Containers and LRP", Retrieved at <<http://www.cs.rice.edu/CS/Systems/ScalaServer/code/rescon-lrp/README.html >>, Version: 1.0, Retrieved Date: Sep. 22, 2010.

Gupta et al., Resource Partitioning for Multi-Party Real-Time Communication; TR-94-061; Nov. 1994; retrieved at <<http://citeseerx.ist.psu.edu/viewdoc/download?doi=10.1.1.53.17488&rep=rep1&type=pdf>>.

Stets et al., "Component-based Operating Systems APIs: A Versioning and Distributed Resource Solution"; Jul. 1999; 37 pages; retrieved at <<http://research.microsoft.com/pubs/69712/tr-99-24.doc>>.

"Base Class Library Performance Tips and Tricks"; Jan. 2006; 8 pages; retrieved at <<http://msdn.microsoft.com/en-us/magazine/cc163670.aspx>>.

"Resource Dictionaries"; Sep. 22, 2010; 8 pages; retrieved at <<http://msdn.microsoft.com/en-us/library/cc903952%28VS.95%29.aspx>>.

"Application Resources"; Sep. 12, 2012; 2 pages; retrieved at <<http://developer.android.com/guide/topics/resources/index.html>>.

Kichkaylo et al., "Optimal Resource-Aware Deployment Planning for Component-based Distributed Applications"; 2004 IEEE; pp. 150-159; <http://ieeexplore.ieee.org/stamp/stamp.jsp?tp=&arnumber=1323517>.

Wang, et al., "A Comprehensive Semantic-Based Resource Allocation Framework for Workflow Management Systems"; 2008 IEEE; pp. 831-834; <http://ieeexplore.ieee.org/stamp/stamp.jsp?p=&arnumber=4575225>.

Shankaran et al., "Design and Performance Evaluation of an Adaptive Resource Management Framework for Distributed Real-Time and Embedded Systems"; 2008 EURASIP Journal on Embedded Systems, vol. 2008, Article ID 250895; pp. 1-20; <http://www.cse.wusth.edu/~lu/papers/eurasip.pdf>.

Castillo et al., "Resource Co-Allocation for Large-Scale Distributed Environments"; 2009 ACM; HPDC'09; Jun. 11-13, 2009; Munich, Germany; pp. 131-140; <http://dl.acm.org/citation.cfm?id=1551634>.

Lakew et al., "Management of Distributed Resource Allocation in Multi-cluster Environments"; 2012 IEEE; pp. 275-284; <http://ieeexplore.ieee.org/stamp/stamp.jsp?tp=&arnumber=6407768>.

(56) References Cited

OTHER PUBLICATIONS

"First Office Action and Search Report Received in Chinese Patent Application No. 201110446908.1", Mailed Date: Jan. 6, 2014, 11 Pages.

"Second Office Action and Search Report Received in Chinese Patent Application No. 201110446908.1", Mailed Date: Sep. 12, 2014, 13 Pages.

"Third Office Action Issued in Chinese Patent Application No. 201110446908.1", Mailed Date: Mar. 26, 2015, 10 Pages.

Mohit, et al., "Resource Containers and LPR"; Department of Computer Science, Rice University; Code release version: 1.0; Retrieved from: <http://www.cs.rice.edu/CS/Systems/ScalaServer/code/rescon-1rp/README.html> Sep. 22, 2010; 10 pages.

"Office Action Issued in Chinese Patent Application No. 201110446908.1", Mailed Date: Sep. 6, 2015, 9 Pages.

* cited by examiner

UNIFIED ACCESS TO RESOURCES

CROSS-REFERENCE TO RELATED APPLICATIONS

This application is related to pending U.S. patent application Ser. No. 12/974,747entitled "USER INTERFACE RESOURCE INDEX" filed on Dec. 21, 2010, and U.S. patent application Ser. No. 12/977,113 entitled "RESOURCE DEPLOYMENT BASED ON CONDITIONS" filed on Dec. 23, 2010. The entries of the above-noted applications are incorporated by reference herein.

BACKGROUND

As applications built with different technologies proliferate, developers are lacking a unified and generic way to access application resources across multiple disparate technologies. Different technologies have different resource formats and developers often duplicate resources for different technologies. There is no technology agnostic method of accessing resources for multiple technologies.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture provides a unified interface to access resources in different formats and in disparate resource locations for a consuming application. Moreover, the unified interface is extensible such that users can add additional components to the unified interface to provide access to new resources and new resource references. The interface provides the capability to create a single comprehensive index of all available resources regardless of the resource format.

The resources at a location (e.g., storage, cache, etc.) can exist in different containers (e.g., a file, folder, executable, etc.), which containers are also denoted as resources. Thus, a folder resource can contain files of same or different formats, and other subfolders. A file in the folder can further include multiple resources, and in different formats.

Format-specific indexers are provided for the locations such that the resources at the resource locations are found, enumerated, and processed into a structure suitable for processing by an indexing component into the index. Moreover, a user can introduce a new format-specific indexer for new resources and new resource references such that the new format-specific indexer finds, enumerates, and processes the new resources and resource references into the structure suitable for processing by the indexing component into the index. Accordingly, the unified interface now provides access to the new resources and new resources references as well.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
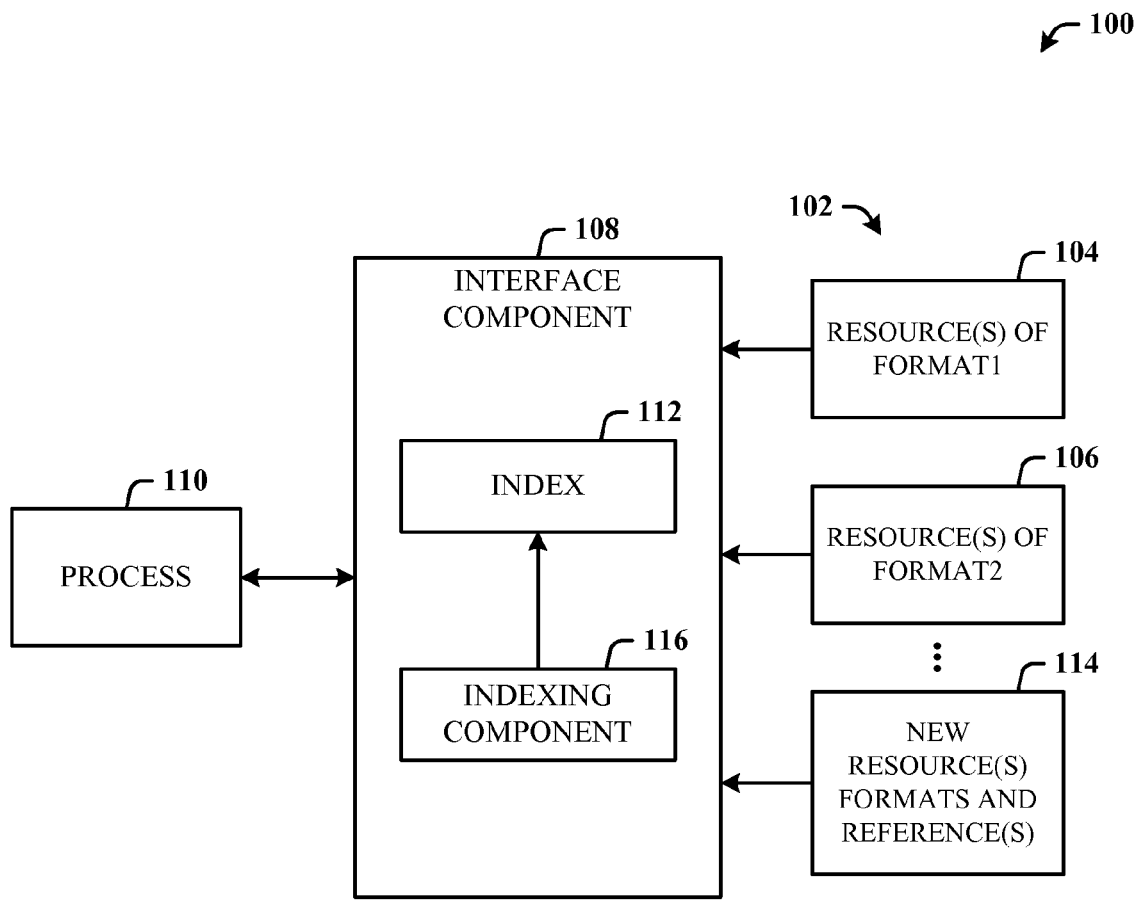
FIG. 1 illustrates a computer-implemented access system in accordance with the disclosed architecture.

The disclosed architecture is a unified access solution (public runtime interface(s)) that provides for access by a process (e.g., consuming application) to diverse resources across multiple disparate technologies. In support thereof, an extensible interface component is provided to allow the creation and utilization of a comprehensive index (also referred to as a primary index) of all resources for disparate resource frameworks and file formats. A format-specific indexer is provided for each resource container (e.g., file, folder, program code, hierarchy, user interface objects, etc.) such that all format-specific indexers each output a structure format suitable for processing into the comprehensive index. Build of the primary index also facilitates the resolution of issues (e.g., missing or incompatible resources), before the associated application is actually running.

The index can contain a reference to a resource or the resource itself. Thus, a developer can aggregate resources in a way that is technology agnostic to the resource container format.

The unified interface allows the developer to build a format-specific indexer that then sends its output to an indexing component that adds the new resources into the primary index. Using such resource-container-specific indexers, any resource format can be added, and thus, accessed in a unified way via the interface component. By enumerating resource containers (e.g., file hierarchy, resource DLLs, etc.) the indexer builds up the common view of resources contained in the folders, executables, and other resource container formats.

The unified interface component comprises a set of interacting components that generate an index of resources, the resources stored as files or stored as elements within some resource-container storage, and then use that index at runtime. The index can be stored in one or in multiple locations, yet be treated as a single resource collection at runtime.

The interacting components include, but are not limited to, a resource index data format used for creating an index of managed resources (e.g., UI resources), reader and builder base classes for reading and writing a resource index, an indexer base class used to generate new resource indices and/or to merge resource indices, various extension indexers that are able to index resources contained in a particular store or file format (e.g., indexers for file hierarchies, for DLL (dynamic link library) containers, for JSON (javascript object notation) containers, for generic XML (extensible markup language) containers, or other formats), indexer tools for creating, validating and dumping resource indices, and runtime classes to present aggregate and contextual views of managed resources.

However, it is to be understood that this is just one way of achieving the desired result, since an alternative implementation can be to unify the builder and indexer base classes, for example.

Merging of the index files of the resource packages presupposes that the index is on the system at the time of merge to initialize the merging class. However, this need not be the case since all this is needed for merging is one or more resource-item schema, which can be embodied in the index, exist independent of the index, or utilize a combination of both. During merge of the index files, schema unique names and versions can be compared between index files. If the schema unique names and versions do not match major versions, then the merging index will fail. If only the minor version is different, the merged index file uses the schema of the higher version. If a schema is merged with a different unique name, then the merged index file appends the schema into the index and makes the schema accessible if explicitly specified in certain calls.

During merge, absolute references to resources, such as path values in a file collection, can be adjusted in accordance with factors that are managed by the system. Such factors can include, but are not limited to, packaging options or deployment mechanisms that will be used for deployment of resources onto client systems. For example, for a key /images/logo.jpg, a reference res/de-de/images/logo.jpg might become appllangpack/res/de-de/images/logo jpg, or appx://appllangpack/res/de-de/images/logo.jpg.

As described in the Myapp example, below, the references can also be adjusted to abstract away dimensional attributes managed by the system, such as language-identifier tokens, to derive a neutral item reference from a specific instance reference.

At build time of an application, the resources are enumerated and indexed (as the primary resource index). (In one implementation, the resources can be analyzed for applicability under certain conditions (e.g., if a resource is in an en-US folder, the resource is applicable to English speaking users)).

The primary index can be in a binary format that contains the indexed resources and/or references to resources which can be queried at runtime. The indexes can contain resources of various types, including but not limited to, strings and file paths. The index itself may simply contain references to such resource data residing external to the index. The merge can be performed at install time to remap the available resources and associated locations for use at runtime. However, it is to be understood that merging can potentially occur at other times—any time before a resource needs to be accessed. This can be at deployment (e.g., when an application or application component is uploaded onto a deployment server, or when an application or application component is fetched from a deployment server), at install, after install and prior to application loading, during application loading, or at runtime.

In a reverse operation, when a resource is removed, the associated index is un-merged from the primary index. Alternatively, the records associated with that index can simply be marked in the index as being unavailable.

In deployment, installer mechanisms can invoke indexing, providing information about the consuming application and related resources. A suitable indexer is utilized to generate the index.

The unified solution can be manifested as a tool that abstracts index file APIs (application program interfaces) to provide a command line interface for developers to capture resource hierarchy into metadata form that describes the resources and resource location, and places the metadata into a set of index files. The format-specific indexers facilitate the extensibility and specific handling across supported resource types.

A folder indexer is a type of format-specific indexer. The folder indexer returns the appropriate files and subfolders within a specific folder. The folder indexer interacts with the index base class to discover the resource items.

Resources may be installed in discrete folder collections or the resources are file-based objects. Current resource models require that resources associated with an application are in the same branch of the directory tree. However, the disclosed unified solution addresses new technologies wherein components and files of an application can be isolated from one another when deployed.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a computer-implemented access system 100 in accordance with the disclosed architecture. Resources 102 are utilized that are of arbitrary resource formats. For example, a first resource 104 can be a single resource of a first arbitrary format, and a second resource 106 of a second format can further include resources same or different formats. It is to be appreciated that additional resources 102 can be employed as desired.

An interface component 108 serves to provide a unified access to the resources 102 for a process 110 (where resource data of diverse types can be utilized). The interface component 108 accesses an index 112 that comprises an indexed version of the resources 102. The index 112 can include a resource itself, and/or optionally, a reference to a resource (reference to one or more of the resources). The interface component 108 is extensible to provide the unified access to new resources and new resource references 114.

The interface component 108 provides access to a resource via a resource reference to the resource in the index 112. The resources and references are enumerated to build the index 112, using an indexing component 116. The index 112 includes a resource entry having a format which is technology agnostic to a corresponding format of the resource at the associated resource location. The interface component 108 can be non-extensible, and facilities creation of format-specific indexers that output an indexed set of resources to the indexing component 116. The indexing component 116 creates the index 112 and processes the indexed set from a format-specific indexer into the index 112. Alternatively, the interface component 108 is extensible, and facilitates creation of a new format-specific indexer that outputs an indexed set of the new resources and the new resource references 114 in a format suitable for processing by the indexing component 116 into the index 112.

The resource formats can include at least file-system folders and files of various types, strings, and image data of various formats. This can also include other types and formats of data, such as binary program code, audio content, or any other type of application resource. Additionally, the resources may reside in individual files specific to the resource type, such as JPEG, PNG or SVG image files, as well as residing a resource container such as a dynamic linked library (DLL). Other data container formats may also be used, such as a database system, structured binary file types, or in other structured file types such as files conforming to particular XML schemas. The resource formats can be native resource formats as well (e.g., native to the data type of the resource).

In terms of extensibility, developers can write custom format-specific indexers to extend the unified interface component 108 to support more resource formats. This allows developers to have a unified access to resources stored in various formats, when developing projects that span multiple technologies. The resources 102 can be collected in the native resource formats rather than duplicating the resources for every technology utilized.

Figure 2:
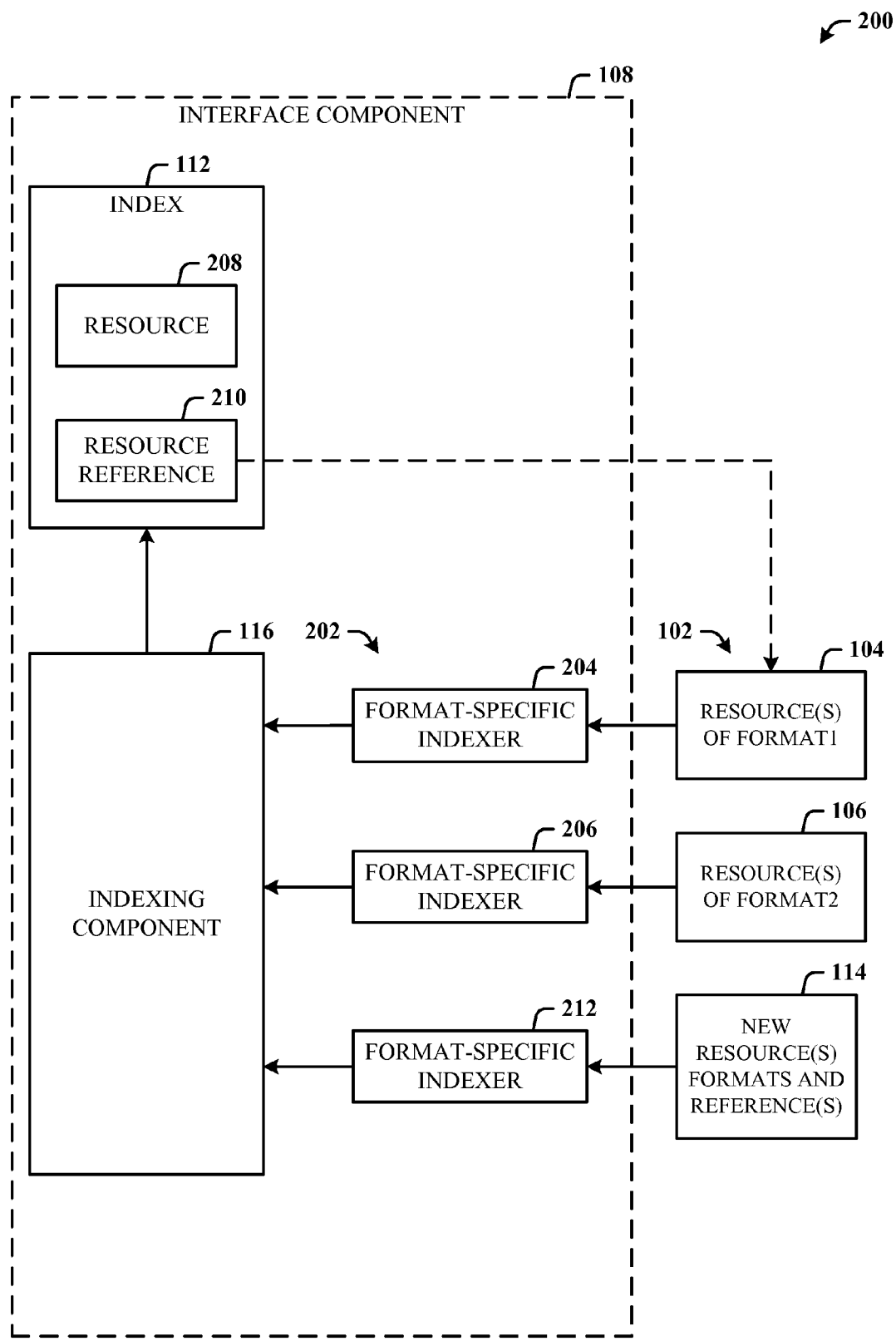
FIG. 2 illustrates a more detailed implementation of an access system.

FIG. 2 illustrates a more detailed implementation of a unified access system 200. Here, the interface component 108 is depicted as including format-specific indexers 202 that feed the indexing component 116 with a structure suitable for processing by the indexing component 116 into the comprehensive index 112. For example, the first resource 104 is associated with a first format-specific indexer 204 that indexes resources of the first format, and the second resource 106 is associated with a second format-specific indexer 206 that indexes resources of the second format. Thus, the interface component 108 includes a format-specific indexer for each arbitrary resource format of the resource 102.

Each format-specific indexer outputs an indexed (or structured) format to the indexing component 116, which creates the single index 112. The index 112 can include resources (e.g., a resource 208) as provided in the structures (outputs) from the format-specific indexers 202, and/or resource references (e.g., a resource reference 210) to specific resource such as the first resource 104.

Thus, a process (e.g., consuming application) accesses the interface component 108, which via the index 112 can retrieve a resource directly from the index or be guided to the location of the resource via the resource reference.

The system 200 is extensible in that a user can add a new format-specific indexer 212 to handle the new resource formats and references 114, as desired for the particular implementation. Thus, at runtime (or at other desired times) the new resources are merged into the index 112 via processing by the indexing component 116. A format-specific indexer can be created and employed for an explicit list that describes the different resources. Thus, the user (e.g., application developer, runtime user, etc.) specifies the exact list of resources that are to be used in the index 112.

Put another way, an access system is provided that comprises resources of arbitrary resource formats in disparate resource locations, and an interface component that provides unified access to the resources for a process (e.g., a consumer application). The interface component comprises an index that includes resources and/or references to resources, and an indexing component that creates the index of the resources and the references to resources. The interface component is extensible to enable unified access to new resources and new resource references as added into the index by the indexing component.

The interface component includes a resource reference to a specific resource. The interface component further comprises format-specific indexers for resource containers that find, enumerate, and convert container resources into structures suitable for processing by the indexing component into the index. A format-specific indexer is utilized to explicitly specify an exact list of resources to include in the index. The extensibility of the interface component allows creation of a new format-specific indexer that enumerates and converts a new resource of a new format into an index structure suitable for inclusion in the index by the indexing component. The resource type and formats supported can include a folder, program code, a file, user interface objects, an executable file, a file that contains other resources, and/or file hierarchy.

Figure 3:
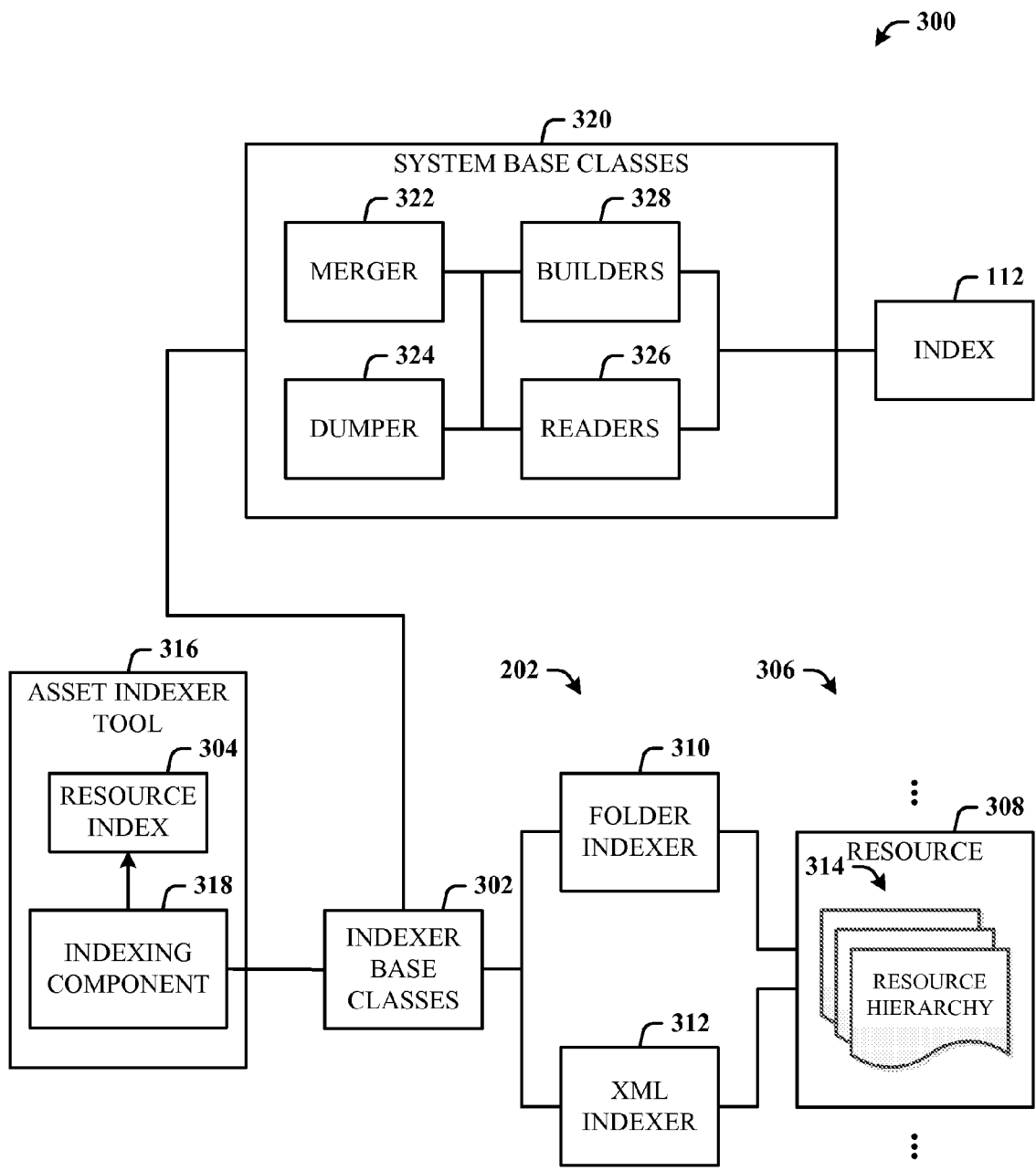
FIG. 3 illustrates a high-level view of an indexing system in accordance with the disclosed unified solution.

Following is a more detailed description of one example instantiation of the disclosed architecture that employs an interface that utilizes the single comprehensive index 112 for disparate resources of a process (e.g., application). FIG. 3 illustrates a high-level view of an indexing system 300 in accordance with the disclosed unified solution. The architecture (and system 300) provides indexer base classes (IBC) 302 to support the creation of a resource index 304 of resources 306 (e.g., resource 308). In particular, the IBC 302 provide a public internal API available for both a developer environment and the target client machine deployment and resource runtime. The IBC 302 facilitate creation of the resource index 304 and the management of resource indices. The IBC 302 utilize the format-specific indexers 202 (e.g., a folder indexer 310 and an XML indexer 312) and declarative configuration rules to interact with resource hierarchies 314.

The IBC 302 facilitate return of the resource hierarchy 314 of the resource 308 to an indexer tool 316 (via the format-specific indexers 202) that provides the indexing capability via an indexing component 318 (similar to indexing component 116) to output the resource index 304. In one implementation, as shown, the IBC 302 are independent of the indexing component 318. Alternatively, the indexing component 318 can comprise the IBC 302 and/or the collection of format-specific indexers 202. Additionally, in one alternative embodiment, the system base classes 320 that write the index 112 can interact with the indexing component 318 (that is, system base classes 320 interact with the IBC 302, and the IBC 302 is a component of the indexing component 318).

The IBC 302 also interact with system base classes 320. The system base classes 320 include functionality for merging (a merger 322), dumping (dumper tools 324), reader base classes 326 and builder base classes 328 to interact with resource index. (Note that denoted as "index files" in some places herein, it is to be understood that there is no requirement that the index(es) reside as an independent file.) Additionally, it is to be understood that this is simply one possible instantiation, and the others can be employed. For example, to build an index that spans different types and formats of resources and to retrieve the index, functionality can be employed to write and read the index, but not to merge indices or to dump index data.

The merger 322 enables the merge of resource indexes as output from the several format-specific indexers to merger with the index 112. The dumper tools 324 enable $3^{rd}$-party developers to analyze the resources placed in indexes and the associated applied conditions. Ultimately, the output is the primary index 112.

As part of the base class design, configuration rules for indexing content and the creation of format-specific indexer extensions is also provided. The configuration rules can be in XML to specify the relationship between resource/resource types and dimensions or specific values in a dimension. For example, files in directories named with language names can be used to satisfy resource requests for those particular languages. In this case the dimension is language, the resources are files, and the relationship to values in the dimension can be based on the directory name containing the files. It is to be understood that this is just one possible optional instantiation.

Format-specific indexers 202 are called by the base classes 302 to open and identify the content of nodes in the resource hierarchy 314. Building on the example above, the indexer tool 316 for directories and files is provided. Such an indexer reports the contents of a directory and identifies attributes for each item to the base class.

This feature also provides some common functionality for use by the format-specific indexers 202 to make decisions on assigning particular values in a dimension. This common functionality is built with some common configuration then utilized across format-specific indexers.

The IBC 302 provide the basic functional units to create the resource indexes (e.g., resource index 304) by analyzing the resource hierarchy 314 based on configuration rules and supplied format-specific indexers or by merging a collection of existing indexes. The IBC 302 enable creation of resource indices that provide the metadata which describes resources and resource locations in order to enable runtime identification of the most appropriate resources for a given context.

The architecture is extensible, thereby allowing individual format-specific indexers 202 to integrate with the IBC 302, and enabling the implementation support for additional resource formats or resource-container formats with greater agility and lower cost. The developers of the individual format-specific indexers are able to utilize common functionality for determining dimensional values, allowing the focus to be directed to the specific formats in which resources are contained.

The IBC 302 build a set of indexes from the set of resource hierarchies 314. The IBC 302 utilize the system base classes 320 to actually build the package resource index files and format specific indexers to traverse the resources 306. The IBC 302 orchestrate the process and follow particular logic to build the correct set of indexes. The IBC 302 also provide a unified mechanism for the format specific-indexers 202 to query when determining applicable conditions from the metadata of a resource (e.g., resource 308).

Figure 4:
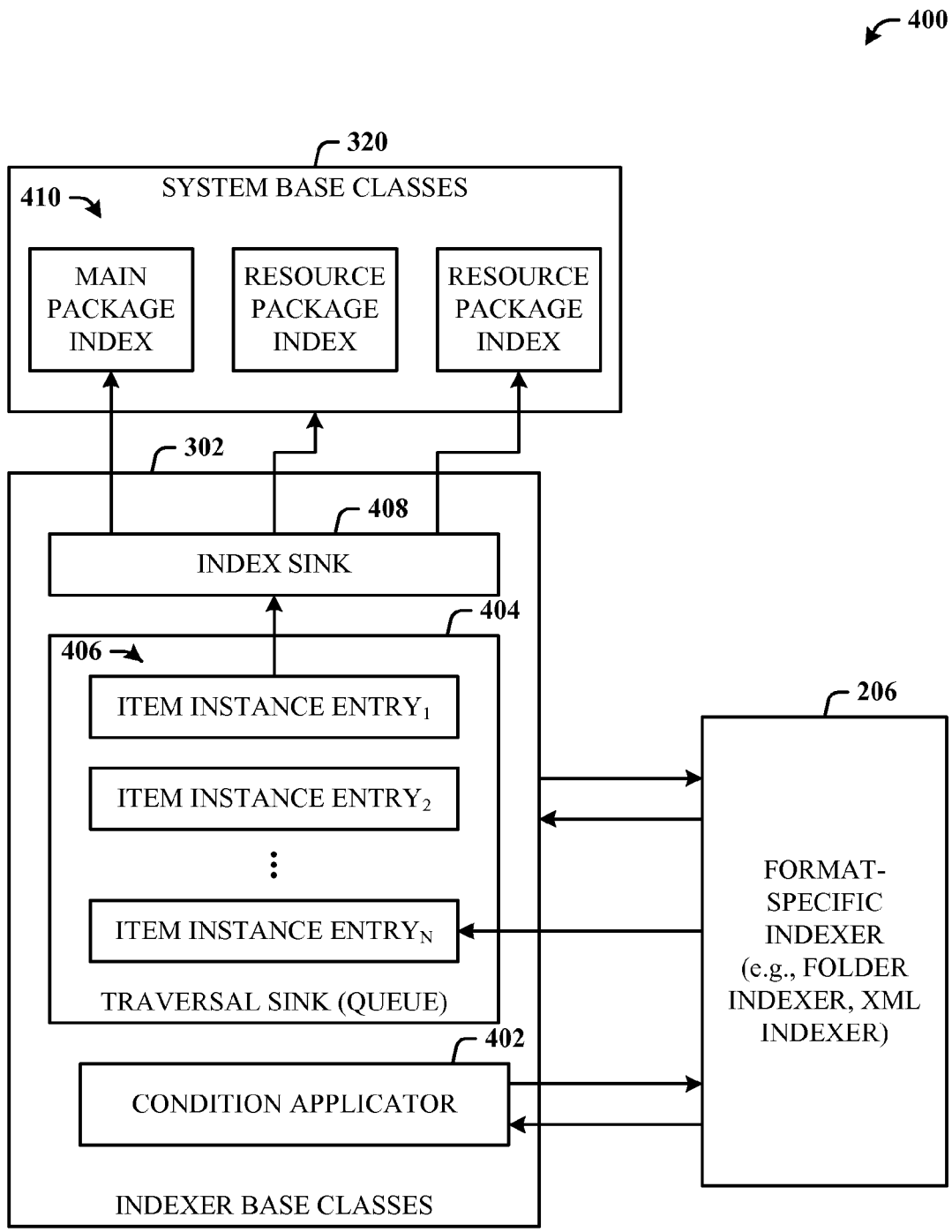
FIG. 4 illustrates a more detailed description of a system that employs the index base classes.

FIG. 4 illustrates a more detailed description of a system 400 that employs the index base classes 302. The system 400 is described in terms of a consuming application (or more broadly, a process) that creates packages from the available resources. It is to be noted that this is simply one example embodiment. For example, where a single system is provided that supports different types and formats of resources, then the management of conditions and associated components such as the condition applicator are optional. However, it is to be understood that the process(es) (e.g., consuming application(s)) can be for any suitable purpose. Moreover, conditions can be applied that restrict the utilization of the resources for a given purpose. The IBC 302 are shown as including a condition applicator 402, a traversal sink 404, item instance entries 406 in the sink 404, and indexer sink 408. As previously indicated, a format-specific indexer (e.g., indexer 206) interacts with the IBC 302. Ultimately, the system base classes 320 can be utilized to create a main and resource package indexes 410. This is now described in detail, as one example embodiment.

Following is a set of exemplary class definitions for the IBC 302.

Condition Applicator

```
HRESULT ConditionApplicator(
    In      XMLNode           indexPassConfig,
    In      Environment       environment,
    In      ConditionSetPool  conditionSetPool
);
HRESULT ApplyConditions(
    In      String            token,
    In      Int               conditionSetIndex,
    Out     Int               newConditionSetIndex,
    Out     Bool              isCondition
);
```

Item Instance Entry

```
String      CollectionName
String      ItemName
String      ItemTypeName
String      InstanceValue
Int         conditionSetPoolIndex
Bool        toTraverse
Bool        toIndex
```

Item Instance Sink

```
ItemInstanceEntry [ ]           Entries
HRESULT          Add (ItemInstanceEntry)
```

Index Pass

```
HRESULT IndexPass (
    XMLNode           configXml,
    Environment       environment,
    ConditionSetPool  conditionSetPool,
    FilePath          projectRootPath
);
HRESULT process (
    ItemInstanceSink  traversalSink,
    ItemInstanceSink  indexSink
);
```

Resources Indexer

```
ItemInstanceSink         traversalSink;
ItemInstanceSink         indexSink;
HRESULT ModernResourcesIndexer (
    String                      configXml,
    FilePath                    projectRootPath,
    FilePath                    outputFolder,
    Int                         majorVersion
);
HRESULT ModernResourcesIndexer (
    String           configXml,
    FilePath         projectRootPath,
    FilePath         outputFolder,
    FilePath         previousIndex
);
HRESULT process ( );
```

The condition applicator 402 is a central place to identify a given string as a condition and apply the conditions to an ItemInstanceEntry. This applicator 402 is the object that performs recognition of and assignment of conditions from tokens (e.g., file names, file paths, etc.) extracted by the format-specific indexer 206 from items such as a folder and filename (e.g., of the resource hierarchy 314). This implementation of the condition applicator, which recognizes conditions declared as tokens in file or folder names, is just one possible way to declare conditions on resource instances, and is not to be construed as limiting in any way.

The following condition applicator constructor,

```
HRESULT ConditionApplicator (
    In      XMLNode           indexPassConfig,
    In      Environment       environment,
    In      ConditionSetPool  conditionSetPool
);
``` constructs a ConditionApplicator object. Inputs include the index pass configuration data, an environment object which defines supported context attributes, and a ConditionSetPool object, which contains the list of condition sets.

The following is an Apply Conditions constructor,

```
HRESULT ApplyConditions (
    In      String   token,
    In      Int      conditionSetIndex,
    Out     Int      newConditionSetIndex,
    Out     Bool     isCondition
);
``` which attempts to apply a Context Attribute and value for a given string. Inputs include the string to interpret as a condition, and an index into a condition set pool, which defines a set of conditions.

Outputs include an index into a condition set pool (e.g., newConditionSetIndex). The condition set pool defines a superset of the conditions from the set referenced in the previous argument. Conditions may have been added to the condition set. It is also possible that no conditions are added if the token was a duplicate condition to one of those passed in. This output is guaranteed to return the same index if the union of the conditions passed in and the conditions applicable to the token are the same. Outputs also include whether the string token passed in was determined to be a condition (e.g., isCondition). This does not necessarily mean a condition was added.

In one implementation, the condition applicator 402 attempts to recognize a string as a BCP47 valid tag.

The traversal sink 404 and index sink 408 are data structures maintained by the IBC 302 and contain the Item Instance Entries 406. The traversal sink 404 and index sink 408 are both ItemInstanceSinks, and may be implemented as a queue internally.

The IBC 302 enumerate the traversal sink entries 406 to be used by format-specific indexers, and adds those Item Instance Entries 406 to the index sink 408. From the index sink 408, the entries are added to the final index files.

The following Add Item Instance Entry,

HRESULT Add (ItemInstanceEntry)

adds an Item Instance Entry to the sink. The input is the Item Instance Entry to add.

During construction of the IBC 302, a set of index passes is defined by the index sections of the configuration. An indexing pass defines a section of the resource hierarchy to index. Having multiple index passes allows for separate resource hierarchies to be indexed together without having complex exclusion rules.

The Index Pass constructor,

```
HRESULT IndexPass (
    XMLNode           configXml,
    Environment       environment,
    ConditionSetPool  conditionSetPool,
    FilePath          projectRootPath
);
``` builds a new Index Pass Class object. Inputs include the index pass XML configuration data, and the environment used to define the context attributes. The ConditionSetPool defines the condition sets for the resources and the absolute path to the project root folder.

The following Index Pass process object,

```
HRESULT process (
    ItemInstanceSink    traversalSink,
    ItemInstanceSink    indexSink
);
``` processes an index pass.

Following is an example workflow for the index pass. First, a list of indexers is determined from configuration data for an index pass. Under this determination, with the index pass configuration data, unique indexers are identified that are included in the pass (duplicate configuration data is ignored), indexers are constructed with the whole index pass configuration data, and init is called for each format-specific indexer. Second, a root item is pushed onto the traversal sink with the following: collection, ItemName, ItemType, InstanceValue, Conditions (the dimensions defined in the dimension elements), and InstanceType. Finally, begin the indexing loop.

Inputs include the traversal sink 404 to add ItemInstanceEntries to for traversing, and the index sink 408 to add ItemInstancesEntries to for which to build the index.

With respect to initialization, the construction of the IBC begins by performing checks against the inputs, establishing the TraversalSink and initial values, and then setting up the index passes from the configuration data.

The following constructor builds a new IBC object that handles construction with version,

```
HRESULT ModernResourcesIndexer (
    String    configXml,
    FilePath  projectRootPath,
    FilePath  outputFolder,
    Int       majorVersion
);
```

The inputs can include the index configuration as an XML DOM (document object model) Node, the name field within the packageID section of the package manifest, the absolute path to the project root folder from which to do all the indexing (all indexing is done beneath this directory), the absolute path to the folder to output index files to, and the major version from which the indexes derive the version from.

The following constructor builds a new IBC object with a previous index file to which to compare new indexes.

```
HRESULT ModernResourcesIndexer (
    String          configXml,
    FilePath        projectRootPath,
    FilePath        outputFolder,
    FilePath        previousIndex
);
```

The inputs can include the index configuration as an XML DOM Node, the absolute path to the project root folder from which to do all the indexing, the absolute path to the folder to output index files to, and the absolute path to the index file.

The process begins the indexing process by invoking the appropriate index passes and then building the primary resource indexer files with the indexed resources.

HRESULT process ( );

The workflow includes constructing the environment, constructing the Traversal Sink, constructing the Index Sink, instantiating and processing Index Passes, and packaging Index Sink entries.

With respect to the configuration format, the configuration passed to the IBC can take a form similar to the following. (MSXML (Microsoft XML) can be utilized in XML operations for DOM support and XML schema validation.)

```
<resources>
    <packaging autoResourcePacks="true">
        <main-package>
            <resource dimension="language" equals="en-us" />
        </main-package>
        <resource-package name="Europe">
            <resource dimension="language" equals="fr-fr" />
            <resource dimension="language" equals="de-de" />
        </resource-package>
        <resource-package name="Chinese">
            <resource dimension="language" equals="zh-ch" />
            <resource dimension="language" equals="zh-si" />
        </resource-package>
    </packaging>
    <index startIndexAt="\res" outputRelativeTo="\">
        <fsi-config id="folder" ... />
        <fsi-config id="xml" ... />
    </index>
    <index startIndexAt="\ui\ml.xml" outputRelativeTo="\ui\ml.xml">
        <dimension type="language" operator="matches" value="en-US" />
        <dimension type="language" operator="matches" value="fr-FR" />
        <fsi-config id="xml" ... />
    </index>
</resources>
```

With respect to the above packaging section, the IBC 302 have the ability to influence the way resources get placed in different packages 410. By placing resources in different indexes a packaging tool can then read the indexes and determine files to place into a particular package along with the appropriate index. The index does not necessarily describe the full set of files in a package. Some files may be included in a package, where the files are not listed in the index.

The above packaging section dictates the output of the IBC, and determines the number of index files the packaging section creates and the items that go into the index files. The IBC maintains the list of index files to distribute items received from format-specific indexers to the correct index file. Within the packaging section, configuration data defines more specifically the contexts each index contains. There is a main package defined in the packaging section if no resource schema has been given in the constructor of the IBC.

The resource schema is a collection of resource items that a developer groups together, typically because the items are used in a common scenario. For example, if an application has two string items, a Welcome string and an Exit string, each with instances in six languages, then the resource schema is comprised of the two items. An application can have a single schema for all of its resource items (the schema being different from the schema for a different application). Alternatively, a developer may have a common component used in different applications, and organize resources such that the common component uses one schema, each set of application-specific resources are in their own schemas, and then each application will use a combination of schemas: the respective application-specific schema plus the common-component schema.

The main package defines the index that contains all items without a context value. If no main package is defined, then it is assumed that resource pack indexes are being built individually with a resource schema from the main package given in the constructor.

All resource packs defined dictate the context of the items that are placed in those indexes. The packaging section also defines an attribute called autoResourcePacks which when true defines the ability to create an index file on-the-fly based on whatever contexts are returned from the format-specific indexers and not relevant to a declared package. If autoResourcePacks is false, all contexts not relevant to a declared package are added to the main package's index. Indexes can be named after the name attribute of the package, except for the main package, which is defined as main.

With respect to the index section, the Index section defines the different indexing sessions or passes performed over the resources. The indexing passes may index certain resources twice, where errors are handled by the system base classes on conflicting resources (such as a folder being indexed twice would lead to a series of warnings thrown by the system base classes). Each indexing pass initializes the correct format-specific indexers given by the configuration information within the index element. Each format-specific indexer is initialized with the index pass configuration. Each index pass also initializes the ConditionApplicator to be used by each format-specific indexer.

Each indexing pass begins by placing the root directory (given by the startIndexAt attribute) onto the traversal sink. The root directory is relative to the project root directory passed into the constructor of the IBC. The root directory serves as the Instance Value for the ItemInstanceEntry on the traversal sink and the outputRelativeTo attribute serves as the item name for the item. The root entry gets conditions applied to it according to the dimension elements defined within the index element.

The IBC utilize appropriate format specific indexers to actually traverse a set of resources. In one implementation, the IBC support two format-specific indexers: a Folder Indexer and an XML Indexer. The IBC determine the appropriate format-specific indexers to instantiate and then run on an resource or resource. The IBC are responsible for bootstrapping, configuring, and running the indexers.

Following is an exemplary IFormatSpecific Interface to which each format-specific indexer adheres, IFormatSpecificIndexer

```
HRESULT    init (
    in     FilePath            projectRoot,
    in     XMLNode             indexPassConfig,
    in     ConditionApplicator conditionApplicator
);
HRESULT    process (
    in     ItemInstanceEntry   Entry,
    inout  TraversalSink       Sink,
    out    bool                RemoveContainer
);
```

Init initializes the format-specific indexer, and each format-specific indexer is constructed once per index pass. Inputs include the project root defined in the constructor of the IBC, an XML Node of the particular index section for the current index pass, and the ConditionApplicator to apply conditions to ItemInstanceEntries based on a string.

Process processes the ItemInstanceEntry used to reference a particular resource container. Each format-specific indexer can be processed synchronously. Inputs include the ItemInstanceEntry to process and the TraversalEntrySink where new itemInstanceEntries are added. The output is if the container passed in should not be indexed.

With respect to system base class interaction, actual index building and writing to file is done by the system base classes 320. The main package index is built and finalized before building the resource pack indexes with the ResourceSchema from the main package. With respect to the main package, once all index passes have completed the PackageResources class for the main package is initialized as appropriate given the constructor parameters for the IBC. After adding all ItemInstanceEntries for the main package, the index is finalized, verified, and written to storage with the name resources_main.indx in the output folder.

With respect to resource packs, once the main package is completed, the resource packs are built appropriately with the associated ItemInstanceEntries. The resource packs are constructed with the ResourceSchema of the main package. After adding all ItemInstanceEntries, the indexes are finalized and written to storage with the appropriate filename from the packaging configuration at the output folder.

Following is an example that illustrates the process. Consider the following file structure:

```
Myapp/
    Config.xml
    Index.html
    images/logo.jpg
    Res/
        images/
            hello.jpg
        fr-fr/
            images/hello.jpg
            strings.xml
```

```
Str1
Str2
```

Consider also the following configuration file config.xml:

```
<resources>
    <packaging autoResourcePacks="true">
        <main-package>
            <resource type="language" value="en-us" />
        </main-package>
    </packaging>
    <index startIndexAt="\res" outputRelativeTo="\">
        <folders:config rule="languagefolders" />
        <xml:config rule="stringcatalogs" />
    </index>
</resources>
```

The following IBC is initialized:

```
newModernResourceIndexer (
    'MyApp\config.xml',
    'MyApp',
    'MyApp\packaging,
    1
);
```

The IBC 302 read the index passes in the configuration, and begins, as indicated below. The IBC initializes the ConditionApplicator with the index pass configuration and a traversal sink. The IBC initializes just one folder and one XML indexer with the index pass configuration. The IBC initializes the queue as the following,

| InstanceValue | Collection | Key | Conditions | toTraverse | toIndex |
|---|---|---|---|---|---|
| res\ | — | \ | — | true | true |

The IBC pop off the first item in the queue and pass res\ to the folder indexer. The folder indexer then adds it to the queue, and returns true to let the IBC know to not place the res\ item in the index.

| InstanceValue | Collection | Key | Conditions | toTraverse | toIndex |
|---|---|---|---|---|---|
| Res\images\ | Files | \images | — | true | false |
| Res\fr-fr\ | Files | \ | fr-fr | true | false |

The images item is then passed to the folder indexer, which then reads the contents of the images folder, read hello.jpg, and add it to the queue.

| | | | | | |
|---|---|---|---|---|---|
| Res\images\hello.jpg | Files | \images\hello.jpg | — | true | true |

The res\fr-fr item is given to all indexers and the folder indexer adds items.

| InstanceValue | Collection | Key | Conditions | toTraverse | toIndex |
|---|---|---|---|---|---|
| Res\images\hello.jpg | Files | images\hello.jpg | — | true | true |
| Res\fr-fr\images | Files | images\ | fr-fr | true | true |
| Res\fr-fr\strings.xml | Files | strings.xml | fr-fr | true | true |

The IBC then looks at res\images\hello.jpg and after getting no true returns from the format-specific indexers, the IBC recognizing that the context is null and the toIndex is true, and adds the instance to the main package index sink. The IBC then looks at res\fr-fr\images and the folder indexer adds items to the queue and returns true for not adding the item to the index.

| InstanceValue | Collection | Key | Conditions | toTraverse | toIndex |
|---|---|---|---|---|---|
| Res\fr-fr\strings.xml | Files | strings.xml | fr-fr | true | true |
| Res\fr-r\images\hello.jpg | Files | images\hello.jpg | fr-fr | true | true |

The IBC then looks at res\fr-fr\strings.xml and the XML indexer adds items to the queue for the different strings. The XML indexer also returns true for not adding the item to the index.

| InstanceValue | Collection | Key | Conditions | toTraverse | toIndex |
|---|---|---|---|---|---|
| Res\fr-r\images\hello.jpg | Files | images\hello.jpg | fr-fr | true | true |
| Oui Oui | strings.xml | Str1 | fr-fr | true | true |
| Bonjour | strings.xml | Str2 | fr-fr | true | true |

Eventually, the strings and image get added to the index, and toIndex is marked true. These strings and image get added to the fr-fr index queue because autoResourcePacks is set true.

Then the index manager goes through its index queues and builds the package resource index for the main package and then uses the schema for that package to build the package resource index files for the resource packs. The main package is named resources_main.indx and the resource pack is called resources_fr-fr.indx.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 5:
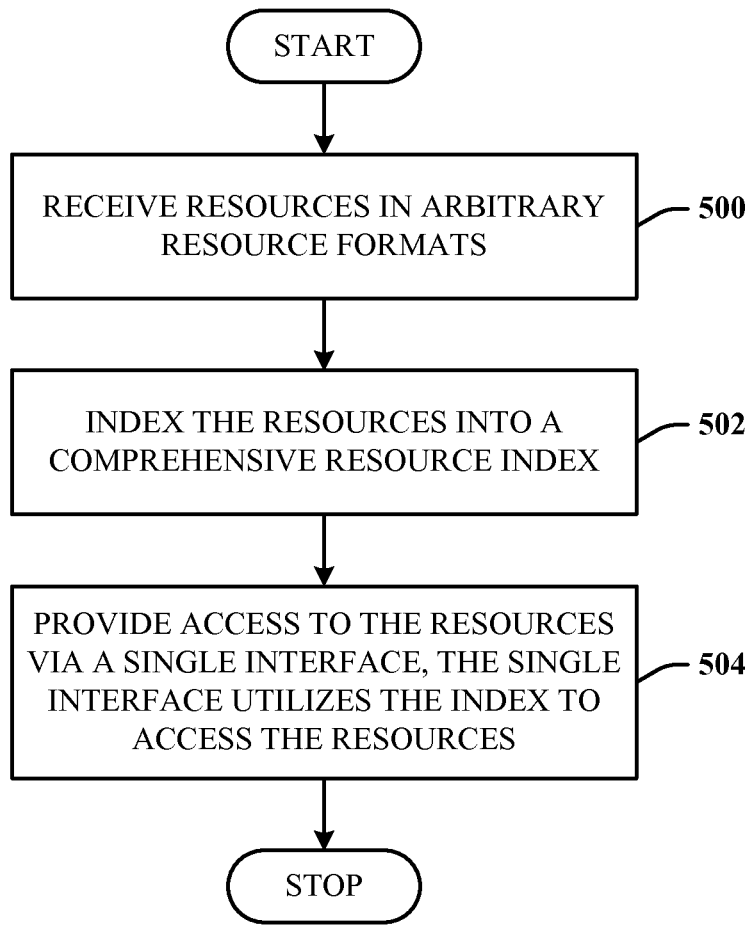
FIG. 5 illustrates a computer-implemented access method in accordance with the disclosed architecture.

FIG. 5 illustrates a computer-implemented access method in accordance with the disclosed architecture. At 500, resource in an arbitrary resource formats, are received. At 502, resources are indexed into a comprehensive resource index. At 504, access to the resources is provided via a single interface, the single interface utilizes the index to access the resources.

Figure 6:
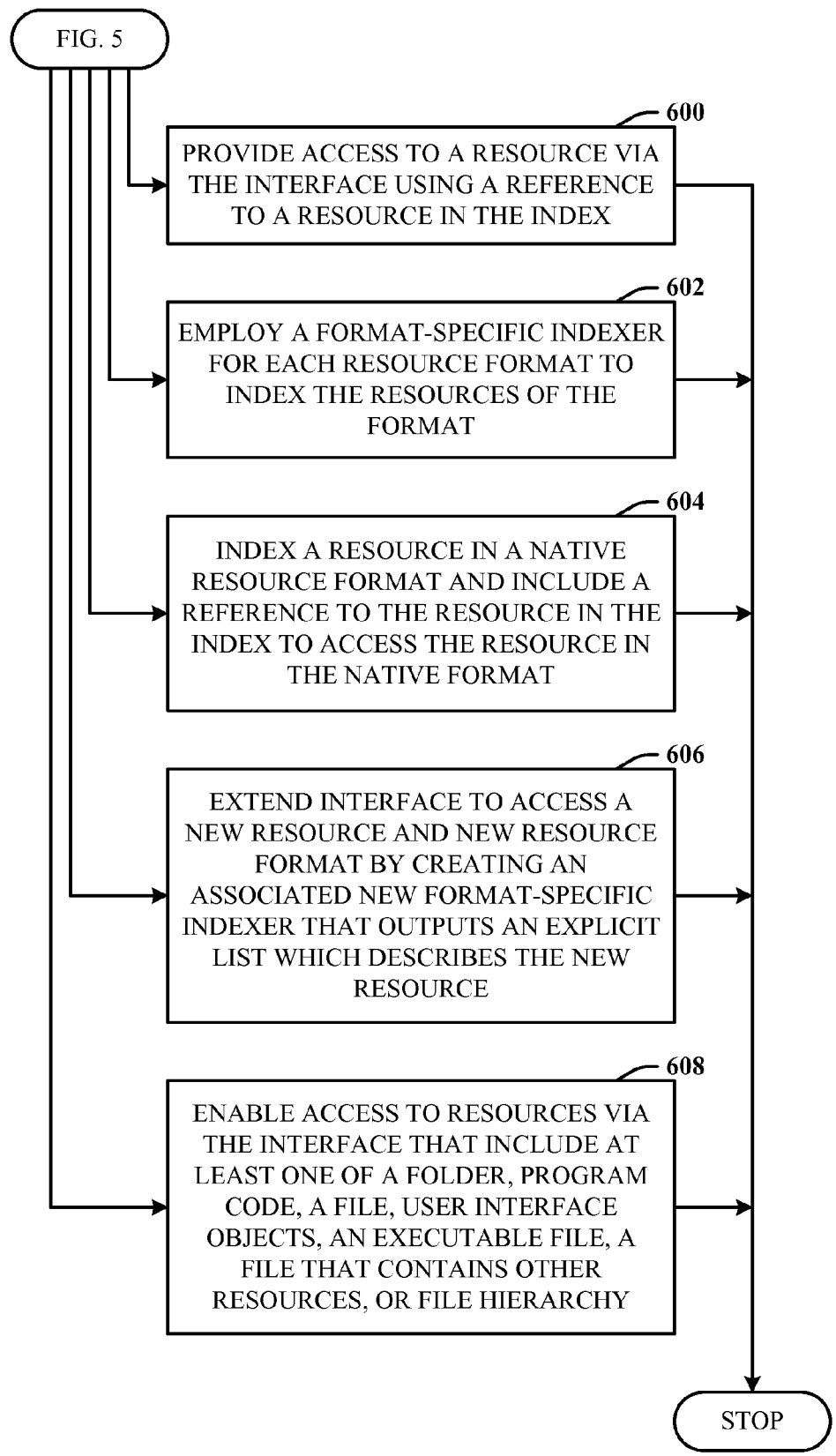
FIG. 6 illustrates further aspects of the method of FIG. 5.

FIG. 6 illustrates further aspects of the method of FIG. 5. Note that the arrowing indicates that each block represents a step that can be included, separately or in combination with other blocks, as additional aspects of the method represented by the flow chart of FIG. 5. At 600, access is provided to a resource via the interface using a reference to a resource in the index. At 602, a format-specific indexer is employed for each resource format to index the resources of the format. At 604, a resource is indexed in a native resource format and a reference to the resource is included in the index to access the resource in the native format. At 606, the interface is extended to access a new resource and new resource format by creating an associated new format-specific indexer that outputs an explicit list which describes the resource. This allows third-party developers to customize the architecture for local needs. At 608, access to resources is enabled via the interface, the resources include at least one of a folder, program code, a file, user interface objects, an executable file, a file that contains other resources, or file hierarchy.

As used in this application, the terms "component" and "system" are intended to refer to a computer-related entity, either hardware, a combination of software and tangible hardware, software, or software in execution. For example, a component can be, but is not limited to, tangible components such as a processor, chip memory, mass storage devices (e.g., optical drives, solid state drives, and/or magnetic storage media drives), and computers, and software components such as a process running on a processor, an object, an executable, a data structure (stored in volatile or non-volatile storage media), a module, a thread of execution, and/or a program. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 7:
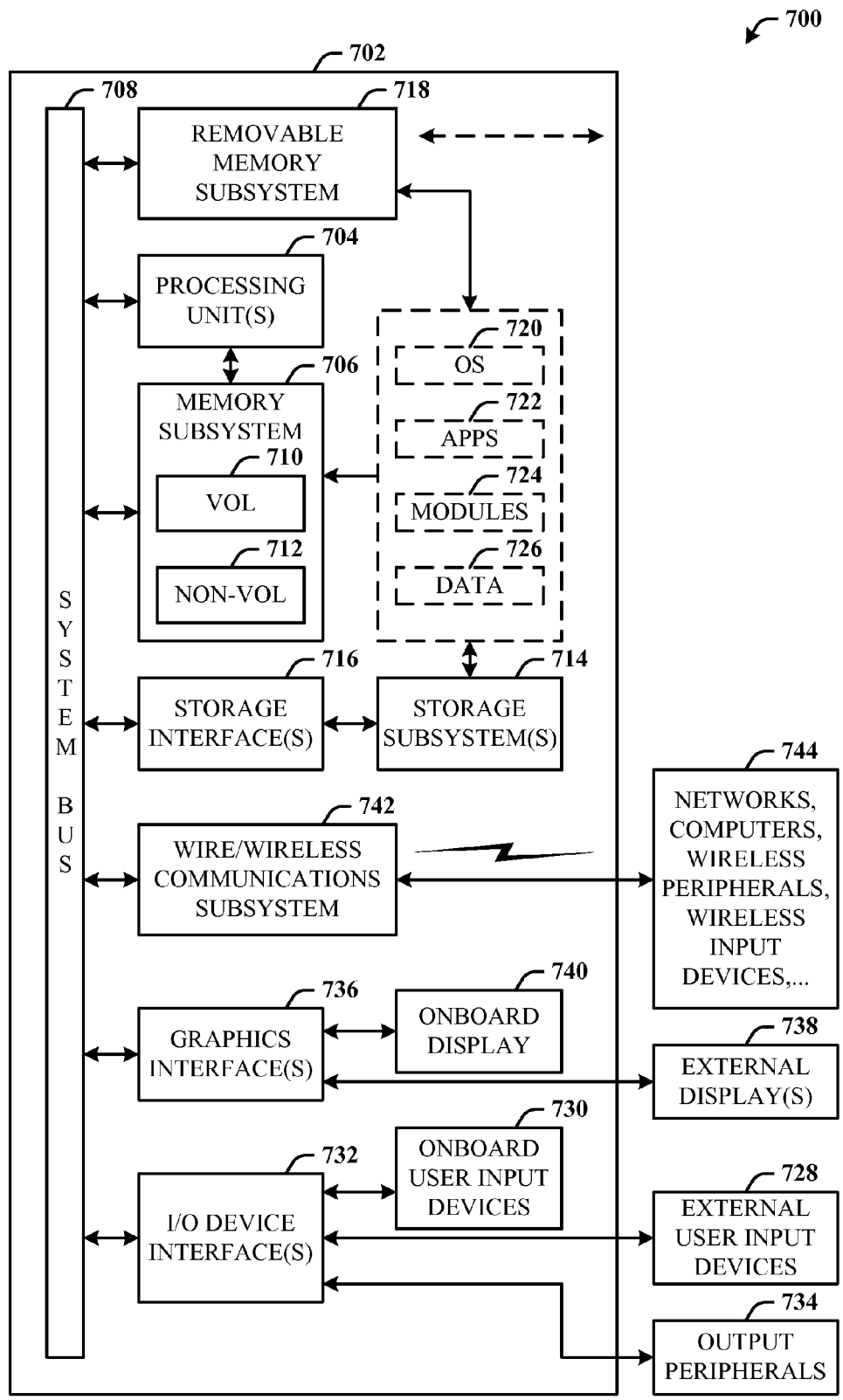
FIG. 7 illustrates a block diagram of a computing system that executes a unified interface for access in accordance with the disclosed architecture.

Referring now to FIG. 7, there is illustrated a block diagram of an example computing system 700 that executes a unified interface for access in accordance with the disclosed architecture. In order to provide additional context for various aspects thereof, FIG. 7 and the following description are intended to provide a brief, general description of the suitable computing system 700 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 700 for implementing various aspects includes the computer 702 having processing unit(s) 704, a computer-readable storage such as a system memory 706, and a system bus 708. The processing unit(s) 704 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 706 can include computer-readable storage (physical storage media) such as a volatile (VOL) memory 710 (e.g., random access memory (RAM)) and non-volatile memory (NON-VOL) 712 (e.g., ROM, EPROM, EEPROM, etc.). A basic input/output system (BIOS) can be stored in the non-volatile memory 712, and includes the basic routines that facilitate the communication of data and signals between components within the computer 702, such as during startup. The volatile memory 710 can also include a high-speed RAM such as static RAM for caching data.

The system bus 708 provides an interface for system components including, but not limited to, the system memory 706 to the processing unit(s) 704. The system bus 708 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 702 further includes machine readable storage subsystem(s) 714 and storage interface(s) 716 for interfacing the storage subsystem(s) 714 to the system bus 708 and other desired computer components. The storage subsystem(s) 714 (physical storage media) can include one or more of a hard disk drive (HDD), a magnetic floppy disk drive (FDD), and/or optical disk storage drive (e.g., a CD-ROM drive DVD drive), for example. The storage interface(s) 716 can include interface technologies such as EIDE, ATA, SATA, and IEEE 1394, for example.

One or more programs and data can be stored in the memory subsystem 706, a machine readable and removable memory subsystem 718 (e.g., flash drive form factor technology), and/or the storage subsystem(s) 714 (e.g., optical, magnetic, solid state), including an operating system 720, one or more application programs 722, other program modules 724, and program data 726.

The operating system 720, one or more application programs 722, other program modules 724, and/or program data 726 can include the entities and components of the system 100 of FIG. 1, the entities and components of the system 200 of FIG. 2, the entities and components of the system 300 of FIG. 3, the entities and components of the system 400 of FIG. 4, and the methods represented by the flowcharts of FIGS. 5 and 6, for example.

Generally, programs include routines, methods, data structures, other software components, etc., that perform particular tasks or implement particular abstract data types. All or portions of the operating system 720, applications 722, modules 724, and/or data 726 can also be cached in memory such as the volatile memory 710, for example. It is to be appreciated that the disclosed architecture can be implemented with various commercially available operating systems or combinations of operating systems (e.g., as virtual machines).

The storage subsystem(s) 714 and memory subsystems (706 and 718) serve as computer readable media for volatile and non-volatile storage of data, data structures, computer-executable instructions, and so forth. Such instructions, when executed by a computer or other machine, can cause the computer or other machine to perform one or more acts of a method. The instructions to perform the acts can be stored on one medium, or could be stored across multiple media, so that the instructions appear collectively on the one or more computer-readable storage media, regardless of whether all of the instructions are on the same media.

Computer readable media can be any available media that can be accessed by the computer 702 and includes volatile and non-volatile internal and/or external media that is removable or non-removable. For the computer 702, the media accommodate the storage of data in any suitable digital format. It should be appreciated by those skilled in the art that other types of computer readable media can be employed such as zip drives, magnetic tape, flash memory cards, flash drives, cartridges, and the like, for storing computer executable instructions for performing the novel methods of the disclosed architecture.

A user can interact with the computer 702, programs, and data using external user input devices 728 such as a keyboard and a mouse. Other external user input devices 728 can include a microphone, an IR (infrared) remote control, a joystick, a game pad, camera recognition systems, a stylus pen, touch screen, gesture systems (e.g., eye movement, head movement, etc.), and/or the like. The user can interact with the computer 702, programs, and data using onboard user input devices 730 such a touchpad, microphone, keyboard, etc., where the computer 702 is a portable computer, for example. These and other input devices are connected to the processing unit(s) 704 through input/output (I/O) device interface(s) 732 via the system bus 708, but can be connected by other interfaces such as a parallel port, IEEE 1394 serial port, a game port, a USB port, an IR interface, short-range wireless (e.g., Bluetooth) and other personal area network (PAN) technologies, etc. The I/O device interface(s) 732 also facilitate the use of output peripherals 734 such as printers, audio devices, camera devices, and so on, such as a sound card and/or onboard audio processing capability.

One or more graphics interface(s) 736 (also commonly referred to as a graphics processing unit (GPU)) provide graphics and video signals between the computer 702 and external display(s) 738 (e.g., LCD, plasma) and/or onboard displays 740 (e.g., for portable computer). The graphics interface(s) 736 can also be manufactured as part of the computer system board. The disclosed architecture can potentially also be used in the context of a computing system with no graphics or output display interfaces (e.g., providing UI resources that will be displayed on a remote system, or providing non-UI resources for an application used to control a device with no human interaction).

The computer 702 can operate in a networked environment (e.g., IP-based) using logical connections via a wired/ wireless communications subsystem 742 to one or more networks and/or other computers. The other computers can include workstations, servers, routers, personal computers, microprocessor-based entertainment appliances, peer devices or other common network nodes, and typically include many or all of the elements described relative to the computer 702. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 702 connects to the network via a wired/wireless communication subsystem 742 (e.g., a network interface adapter, onboard transceiver subsystem, etc.) to communicate with wired/wireless networks, wired/wireless printers, wired/wireless input devices 744, and so on. The computer 702 can include a modem or other means for establishing communications over the network. In a networked environment, programs and data relative to the computer 702 can be stored in the remote memory/storage device, as is associated with a distributed system. It will be appreciated that the network connections shown are exemplary and other means of establishing a communications link between the computers can be used.

The computer 702 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

The illustrated and described aspects can be practiced in distributed computing environments where certain tasks are performed by remote processing devices that are linked through a communications network. In a distributed computing environment, resource containers can be located in local and/or remote storage and/or memory system.

Figure 8:
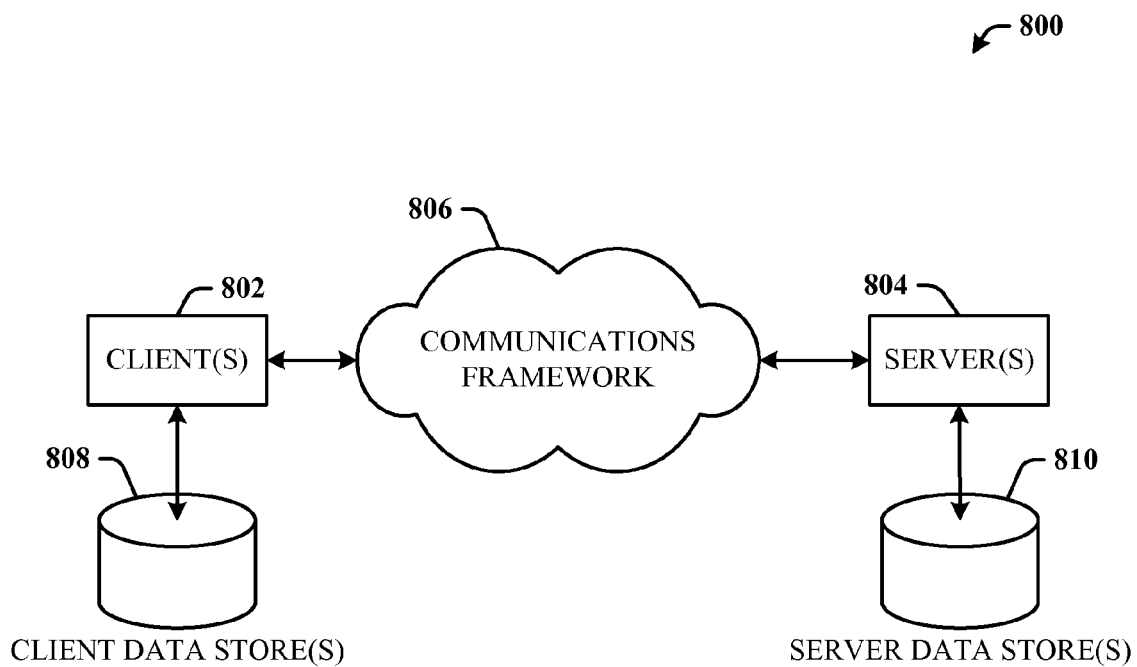
FIG. 8 illustrates a schematic block diagram of a computing environment that utilizes a unified interface for resource access.

Referring now to FIG. 8, there is illustrated a schematic block diagram of a computing environment 800 that utilizes a unified interface for resource access. The environment 800 includes one or more client(s) 802. The client(s) 802 can be hardware and/or software (e.g., threads, processes, computing devices). The client(s) 802 can house cookie(s) and/or associated contextual information, for example.

The environment 800 also includes one or more server(s) 804. The server(s) 804 can also be hardware and/or software (e.g., threads, processes, computing devices). The servers 804 can house threads to perform transformations by employing the architecture, for example. One possible communication between a client 802 and a server 804 can be in the form of a data packet adapted to be transmitted between two or more computer processes. The data packet may include a cookie and/or associated contextual information, for example. The environment 800 includes a communication framework 806 (e.g., a global communication network such as the Internet) that can be employed to facilitate communications between the client(s) 802 and the server(s) 804.

Communications can be facilitated via a wire (including optical fiber) and/or wireless technology. The client(s) 802 are operatively connected to one or more client data store(s) 808 that can be employed to store information local to the client(s) 802 (e.g., cookie(s) and/or associated contextual information). Similarly, the server(s) 804 are operatively connected to one or more server data store(s) 810 that can be employed to store information local to the servers 804.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented method, comprising:
    obtaining first resources, wherein the first resources are associated with a plurality of resource formats, and wherein at least one of the first resources is a container resource;
    using a plurality of first format-specific indexers of an interface component, converting the first resources into an index structure and outputting the index structure to an indexing component, wherein each format-specific indexer of the plurality of format-specific indexers corresponds to a respective one of the resource formats; and
    responsive to the indexing component receiving the index structure, indexing the first resources into a resource index and storing the resource index in a memory;
    wherein the interface component is extensible to enable unified access to a second resource responsive to receiving a second format-specific indexer corresponding to the second resource.

2. The method of claim 1, wherein the plurality of resource formats comprises a native resource format.

3. The method of claim 1, wherein the first resources include at least one of a folder, program code, a file, a user interface object, or file hierarchy.

4. A memory device having instructions stored thereon that, in response to execution by a processing device, cause the processing device to perform operations comprising:
    obtaining first resources, wherein the first resources are associated with a plurality of resource formats, and wherein at least one of the first resources is a container resource;
    using a plurality of first format-specific indexers of an interface component, converting the first resources into an index structure and outputting the index structure to an indexing component, wherein each format-specific indexer of the plurality of format-specific indexers corresponds to a respective one of the resource formats; and responsive to the indexing component receiving the index structure, indexing the first resources into a resource index and storing the resource index in a memory;

wherein the interface component is extensible to enable unified access to a second resource responsive to receiving a second format-specific indexer corresponding to the second resource.

5. The memory device of claim 4, wherein the plurality of resource formats comprises a native resource format.

6. The memory device of claim 4, wherein the first resources include at least one of a folder, program code, a file, a user interface object, or file hierarchy.

* * * * *